E. J. POWERS.
CHUCK USED IN BROOM MAKING.
APPLICATION FILED JUNE 10, 1911.
1,054,238.
Patented Feb. 25, 1913.
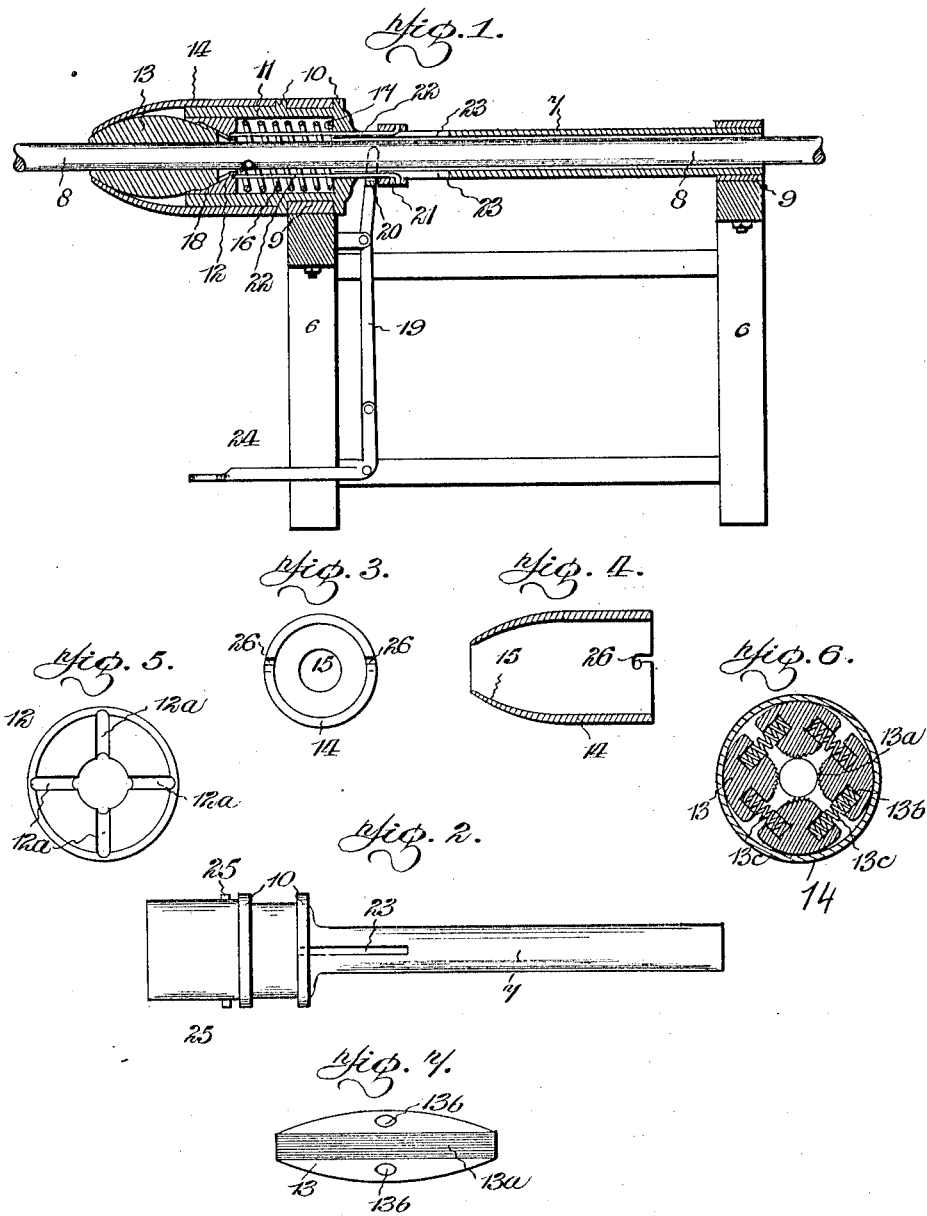
Witnesses:
M. R. Wilson
A. R. Walton
Inventor
Edward J. Powers,
By
Attorneys.

UNITED STATES PATENT OFFICE.

EDWARD J. POWERS, OF CHICAGO, ILLINOIS.

CHUCK USED IN BROOM-MAKING.

1,054,238.   Specification of Letters Patent.   Patented Feb. 25, 1913.

Application filed June 10, 1911. Serial No. 632,331.

*To all whom it may concern:*

Be it known that I, EDWARD J. POWERS, a citizen of the United States, residing at Chicago, in the county of Cook and State of Illinois, have invented certain new and useful Improvements in Chucks Used in Broom-Making, of which the following is a specification.

My present invention relates to broom barrels or chucks used in broom making, and particularly of that character described and claimed in my Patent Number 899,679 granted to me September 29, 1908.

My object is to provide improved jaws adapted to clamp handles of a much greater number of different sizes than the jaws shown in my patent.

A further object is to provide means to prevent rotation of the jaws within the closing ring, which will be greatly improved with respect to strength and simplicity.

In the accompanying drawings, Figure 1 is a vertical section of the device. Fig. 2 is a plan in detail of the tubular spindle. Figs. 3 and 4 are details in section and end view of the chuck shell. Fig. 5 is an end view of the closing ring, removed, and enlarged. Fig. 6 is a central cross-section through the jaws, removed and enlarged, and, Fig. 7 is a detail view of one of the chuck jaws shown in Fig. 6.

As in my patent above referred to, 6 indicates a frame of suitable construction on which the chuck or holder is mounted. The hollow spindle 7 is of proper size to receive a broom handle, indicated at 8, and said spindle rotates in bearings 9 on the frame. The spindle has circumferential flanges 10 at the front end which engage the sides of the bearing box and prevent endwise movement of the spindle. The spindle is enlarged at the front end, as at 11, to form a chamber in which the beveled ring 12 is slidable. Said ring is beveled on its inner surface, and the bevel acts upon one end of the jaws 13 which are held within a tapered shell 14 which fits at its rear end over the enlarged part 11 of the spindle. The shell is beveled on the inner side, as at 15, to bear against the opposite end of the jaws 13, and the shell and ring are beveled at equal angles so as to give a uniform tension on the handle throughout the whole length of the jaws, which is important, as it avoids marring the handle.

The ring 12 is normally pressed forward to close the jaws by means of a coil spring 16 located behind the ring and bearing at its front end against the ring and at its rear end against a shoulder 17 in the spindle. The jaws are supported and prevented from rotation with respect to the closing ring 12, by means of a rib 18 longitudinally, and at the inner end, of each jaw which engages in a conformable slotted recess 12ª in the closing ring. Said ring is normally advanced by the coil spring, but may be retracted by means of a lever 19 which has a fork 20 at the upper end engageable against a collar 21 which is slidable on the spindle and which is connected by rods 22 to the ring 12. Said rods move in slots 23 in the spindle shell. The lever 19 is operated by a treadle 24 connected thereto and fulcrumed on the frame. The shell 14 is held in place by pins 25 projecting outwardly near the front end of the spindle, the shell having bayonet slots 26 in which the pins are engaged. The jaws 13 have their inner handle engaging faces formed convex in a transverse direction and are provided with longitudinally extending sharpened ribs 13ª which enable them to securely grip the work. The jaws are further provided with coinciding tangential bores 13ᵇ in their opposing faces within which are secured the ends of springs 13ᶜ which thus connect the jaws and draw the same closer together when twisting or rotary strain comes on the handle held therein.

In the use of the device, the closing ring 12 may be retracted by pressure on the treadle 24, releasing the direct pressure on the jaws so that the broom handle can be inserted in the chuck. On release of the treadle the coil spring forces the closing ring forward and closes the jaws against the handle, in which position the handle can be readily turned or located for other work thereon.

With the present construction of the jaws and their connections it is unnecessary to employ more than one set, as they will accommodate, and effectively operate with, all the different sizes of broom handles they are required to.

The jaws 13 are free to rock transversely or about their longitudinal axes toward the work to a limited extent, in view of which it will be seen that there is a tendency of the work to draw the convex ribbed faces 13ª inward when the work is rotated, thereby wedging the jaws still tighter against the work. This action takes place irrespective of the direction in which the work is rotated.

I claim:

A work holder comprising an internally beveled shell, a beveled closing ring slidably mounted in the shell, jaws arranged in the shell between the beveled part thereof and the ring, said jaws having convex work-engaging surfaces, and being free to rock transversely in the direction of the work, springs between the jaws and operating means for the closing ring.

In testimony whereof I affix my signature in presence of two witnesses.

EDWARD J. POWERS.

Witnesses:
ANNA M. MENGEL,
H. G. BATCHELOR.

Copies of this patent may be obtained for five cents each, by addressing the "Commissioner of Patents, Washington, D. C."